Jan. 16, 1951  G. W. LEWIS  2,537,945
ENDLESS BELT TYPE COTTON HARVESTER
Filed Aug. 5, 1946  3 Sheets-Sheet 1
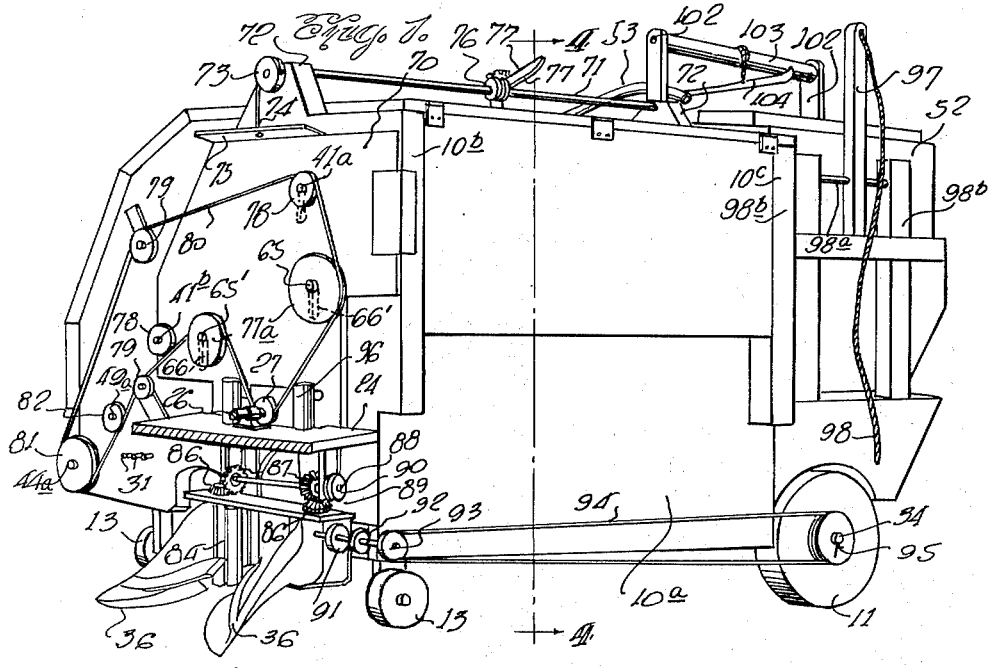
GEORGE W. LEWIS
INVENTOR.
BY
ATTORNEY Jan. 16, 1951 G. W. LEWIS 2,537,945
ENDLESS BELT TYPE COTTON HARVESTER
Filed Aug. 5, 1946 3 Sheets-Sheet 2
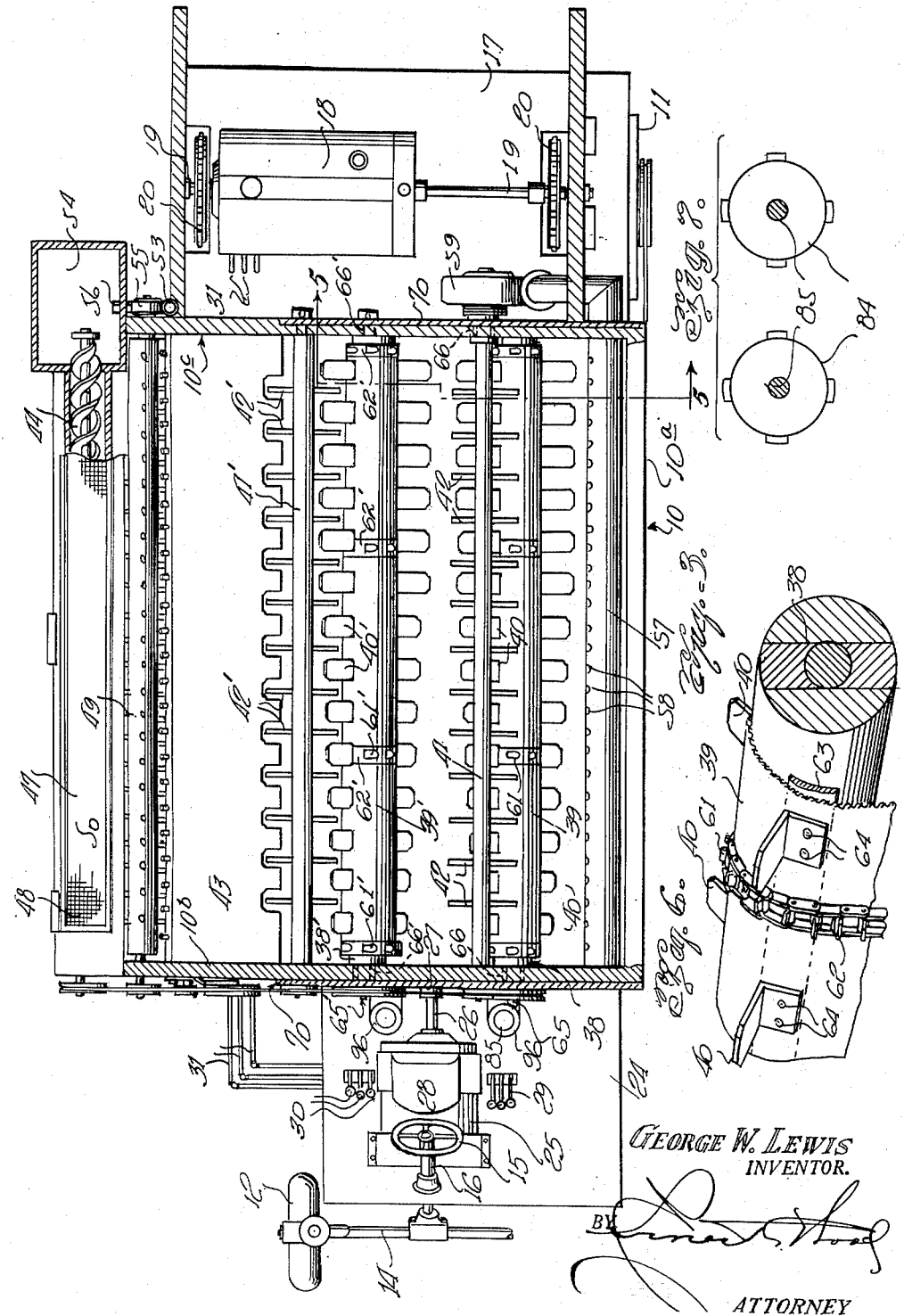
GEORGE W. LEWIS
INVENTOR.
BY
ATTORNEY

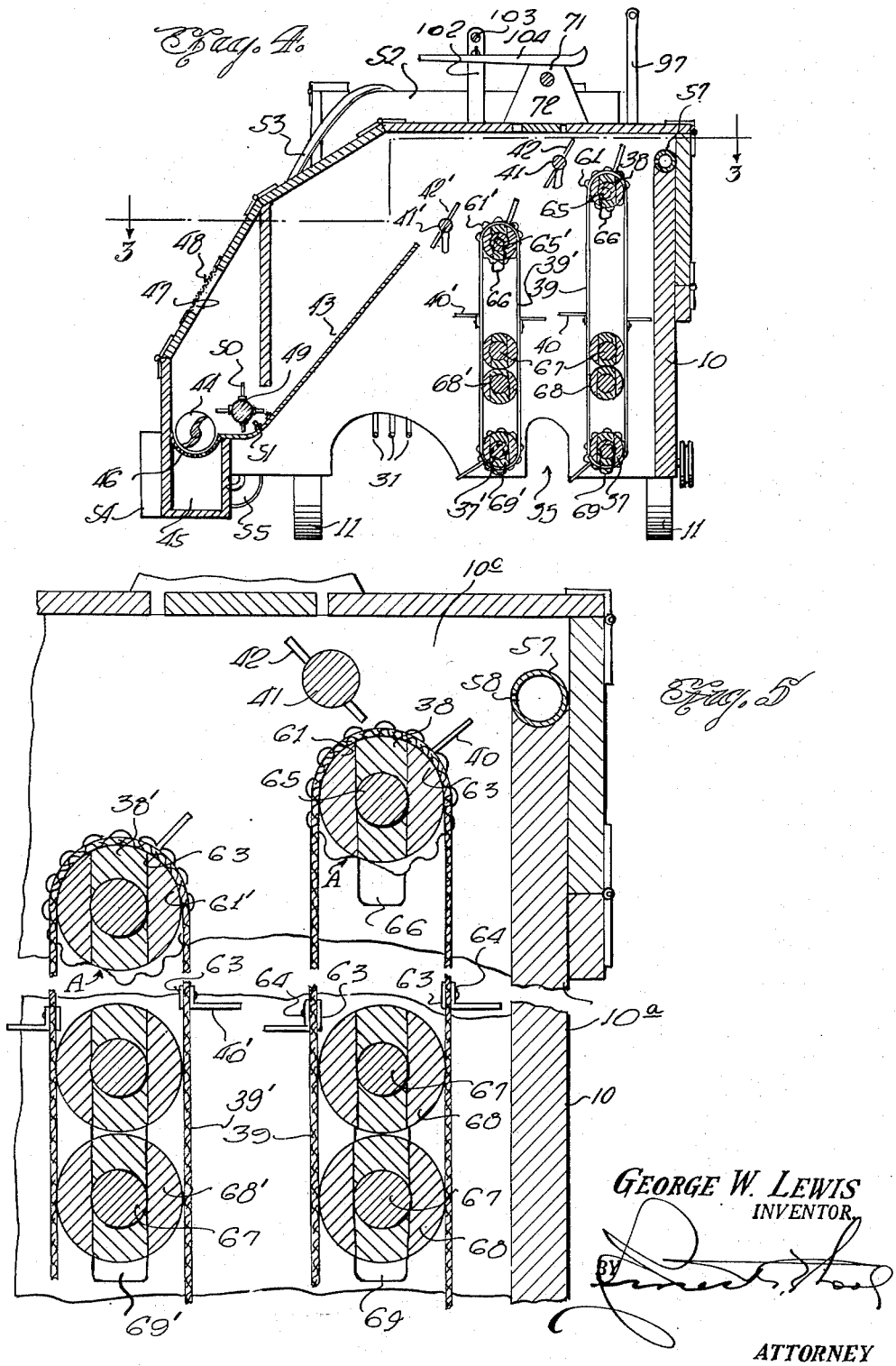

Patented Jan. 16, 1951

2,537,945

UNITED STATES PATENT OFFICE 2,537,945

ENDLESS BELT TYPE COTTON HARVESTER

George W. Lewis, Dallas, Tex.

Application August 5, 1946, Serial No. 688,438

3 Claims. (Cl. 56—30)

This invention relates to row crop harvesting machines and more particularly to machines for harvesting cotton.

The principal object of the invention is to provide a self-propelled machine in which is mounted stalk stripping units consisting of endless belts operating over rollers, said belts having clipping fingers of diminishing length towards the forward end of the machine to admit stalks of cotton, said belts being so disposed that their inner leads are vertically parallel but of different lengths so that the upper end of one unit of the stripping assembly will be elevated above the other to facilitate transfer of the said material into a conveyor through a boll breaker, such transfer being effected by means of knocker rolls appropriately located in relation to the specific unit.

Another object of the invention is to provide means by which vertical adjustment of the stripping assembly may be effected, to accommodate stalks of different heights, combined with means for maintaining tension on the common drive chain or belt irrespective of the position of the stripping assembly, that is to say, whether the same is in highest or the lowest or in any intermediate position.

Another object of the invention is to provide means for elevating material from the conveyor to a suitable receptacle at the rear of the machine from which it is loaded onto a conveyance by tilting said receptacle.

With the foregoing and other objects in view, the invention has further reference to certain features of accomplishment which will become apparent as the description proceeds, taken in connection with the accompanying drawings wherein:

Figure 1 is a front perspective view of the cotton harvesting machine constructed according to the present invention.

Figure 2 is a rear elevational view thereof.

Figure 3 is a view in transverse section, taken on line 3—3 on Figure 4.

Figure 4 is a vertical sectional view taken on line 4—4 on Figure 1.

Figure 5 is a fragmentary sectional view on a slightly enlarged scale, taken on line 5—5 of Figure 3.

Figure 6 is a fragmentary perspective view of one of the rollers of one unit of the stripping assembly, showing the provision for positively moving the flexible belt thereover, which belt carries the stripping fingers, and Figure 7 is a detail plan view of the stalk guide rolls vertically disposed in parallel relationship at the forward end of the machine.

Continuing with a more detailed description of the drawings, reference is primarily made to Figure 1 wherein 10 designates generally the frame of the machine which may be of any suitable exterior design. The frame consists of side walls 10a and front and rear walls 10b and 10c respectively. The frame is supported upon rear wheels 11 while the front wheels 12 thereof are augmented in their support of the forward end of the frame by means of dolly wheels 13. The front wheel axle 14 of the frame is but fragmentarily shown in Figure 3 and one form of steering mechanism is shown which includes the steering wheel 15 and steering column 16, which is suitably connected to the front axle 14. Obviously, any form of conventional steering mechanism may be provided or substituted for that shown.

At the rear end of the frame there is provided a platform or support 17 on which is mounted a motor 18, the latter supplying rotative power to shafts 19, on which are mounted sprocket wheels 20 which operate chains 21, the latter extending under sprocket 22 mounted on the elevated rear axle 23 which carries the rear wheels 11. Supported on the forward end 10b of the frame is an operator's platform 24, which platform supports a second motor but which latter has been omitted in Figure 1 for purposes of clarity. However, this motor, indicated by reference numeral 25 is shown in outline in Figure 3 and whose drive shaft 26, shown in both Figures 1 and 3 is adapted to rotate a sprocket or a pulley 27 (Figure 1) and to which reference will be again made presently.

Mounted above the motor 25 is an operator's seat 28 (Figure 3). Adjacent to the seat 28 are controls 29 for the motor 25 and on the opposite side of the operator's position, there is provided a series of controls 30 for the rear motor 18, through the medium of conduits 31.

It is apparent from the foregoing description that the motor 18 drives the rear wheels 11 of the machine through the medium of the chains 21, sprockets 22, rear axle 23 and chains 32, which drive the rear wheels 11 through the medium of sprocket wheels 33 mounted on the short axles 34 thereof. The purpose in elevating the rear axle 33 is to prevent this axle from interfering with repassage of the machine over the stalks which have been stripped by the stripping assemblies which will now be described.

It will be seen in Figures 2 and 4 that the lower portions of the front and rear walls 10b and 10c of the frame 10 are recessed at 35 to accommodate stalks of cotton. Flanking the recess 35 in the front wall 10b of the frame are guides 36 whose function is to direct the stalks into the recess 35 with as little agitation as possible in order that the open bolls will not be disturbed to cause the cotton therein to fall to the ground. Extending from the front to the rear wall of the frame are parallel rollers 37, 37' while spaced thereabove and in parallel relation thereto are complementary rollers 38, 38' although the innermost roller 38' is disposed at a point slightly below the axis of its companion roller 38 for the purpose to be presently made clear. Operating on each pair of rollers 37 and 38 and 37' and 38' is a flexible belt 39 and 39' respectively of canvas or other suitable material. The arrangement of the belts is such that the inner leads of the belts are parallel and each belt has affixed thereto a plurality of picker fingers 40 in spaced relationship thereon, while like fingers 40' are carried by belt 39'. By virtue of the relative timing in the travel of the belts 39, 39', these fingers, that is to say, the fingers on one belt are maintained in alignment with the corresponding fingers on the companion belt in order that the aligned fingers will move upwardly through the stalk of cotton simultaneously to strip the same of cotton and some foliage and convey the same upwardly.

Adjacent to the upper rollers 38, 38'' are knocker rollers 41 and 41' respectively, each having but two rows of diametrically opposed fingers, the fingers 42 of knocker roller 41 being effective to move in timed relation to the fingers 40 of the belt 39 while like cooperation obtains between the fingers 42' of knocker roller 41' and the fingers 40' of belt 39', to propel stripped material therefrom onto an inclined baffle 43 (Figure 4), which baffle conveys the material downwardly into a flight conveyor 44, which latter lies partially within a trough 45 said trough extending parallel with the frame 10 along one side 10a thereof and is co-extensive with the frame. The conveyor 44 operates over a foraminous concave 46, in the usual manner. Access to the conveyor 44 may be gained through a hinged cover 47 in one side 10a of the frame or its performance may be determined by observing the same through the screen 48 covering an opening in this cover 47.

The stripped material elevated by the stripping assembly and discharge by the knocker rolls 41, 41' onto the inclined baffle 43 will in most cases contain a number of unopened bolls. Before this material enters the flight conveyor 44, it is caused to be passed below a roller 49 which is provided with fingers 50. The fingers 50 of this roller pass between fingers 51 which latter are stationary in relation to the baffle 43 in order that the unopened bolls passing between the fingers 50 of the roller 49 and the stationary fingers 51, will be broken up to release the cotton therein which latter is carried along with the opened cotton into the conveyor 44 and subsequently delivered into a receptacle 52 at the rear of the machine, through a flexible tube or conduit 53. The receptacle 52 will be explained in detail later in the description.

It will be observed in Figures 2 and 3 that the conveyor 44 empties into a box 54, from whence the cotton is drawn by the suction of a blower 55 whose inlet 56 enters the bottom of the box 54 and which discharges into the receptacle 52 through the medium of the tube 53 (Figs. 1 and 4). The mechanism for operating this blower as well as that which operates the various elements just described will be explained presently.

In Figures 3 to 5 inclusive, is shown a conduit 57 against and coextensive with one side 10a of the frame 10 and which is provided with a plurality of apertures 58 throughout the length thereof and along one side next adjacent to the outer of the stripping units. It will be noted that the conduit 57 is elevated slightly above the roller 38 of the unit so that a blast of air may be directed through the apertures against the material elevated by the stripping assembly as an aid to the knocker rolls 41, 41' in propelling the elevated material onto the baffle or chute 43 in the manner described. Air pressure is supplied to the conduit 57 by means of a blower 59, the latter being mounted on the rear platform 17 as shown in Figures 2 and 3. The blower 59 is driven through the medium of a chain 60 (Figure 2), from the shaft of the uppermost knocker roller 41.

Referring again to the stripping assembly, it has been stated that the belts 39 and 39' of the stripping unit must be operated in timed relationship for the reason explained. To accomplish this, each of the upper rollers 38, 38' is provided with a sprocket 61 and 61', respectively. Chains 62 and 62' operate over sprockets 61 and 61', respectively (see Figure 6). The stripper belts 39, 39' are, in fact, in sections, and using for example the belt 39 of roller 38, it will be observed in Figure 6 that the edges of the sections are secured to the intermediate chain 62. Beneath each belt section and extending the length of the entire assembly of sections, there are bars 63 and to these bars are secured, by means of rivets 64, the stripping fingers 40. It is necessary that these bars override the sprocket wheel 61 without interference by the teeth of the sprocket wheel, hence certain of the teeth are removed as at A in Figure 5, to accommodate the bars without interfering with the timing of the belts 39 and 39'.

Referring now specifically to the driving means for the various elements described, it is first mentioned that the stripping assembly, together with the knocker rolls 41 and 41' are adapted to be vertically adjusted to accommodate them to stalks of cotton of different heights. To accomplish this, the ends of the shafts 65 and 65' of the stripper rolls 38 and 38' extend through slots 66 and 66' respectively of the front and rear ends 10b and 10c of the machine frame. This is true also of the shafts 67 of the guide rolls 68 and 68' which, as shown in Figures 4 and 5 are disposed between the upgoing and downgoing leads of the stripper belts 39 and 39', respectively.

The lower rollers 37 and 37' of the stripper unit are also extended through slots 69 and 69', respectively. A like adjustment is provided for the shafts of the knocker rolls 41 and 41'.

The ends of each of the various shafts mentioned are journaled in bearings in vertically movable plates 70 at both the front and the rear ends 10b and 10c of the frame and which plates lie flush with said ends. Consequently, when these plates 70 are moved upwardly or downwardly, the entire stripping assembly will be correspondingly moved. To effect this movement, a shaft 71 extends from the front to the rear of the frame 10 along its top, and its ends are journaled in bearings 72 supported on the ends of the frame. On each end of the shaft there is provided a drum 73 (Figure 1), on each of which is wound a cable 74, the free end of the latter being attached to a protuberance 75 extending outwardly from each of the slidably mounted plates 70. Intermediate the ends of the shaft 71 is a ratchet wheel 76, the latter being rotated by means of a dog or pawl 77 to oscillate the shaft 71 to accordingly move upwardly or downwardly the plates 70 at each end of the machine.

In Figure 1, the ends only of the shafts of the various rollers which are driven exteriorly of the machine are illustrated, for example, the upper shafts 65 and 65' of the rollers 38 and 38' of the stripping assembly and the shafts 41a of the knocker rolls as well as the shaft 49a for the boll breaking roll 49 and the shaft 44a of conveyor 44. Mounted on the ends of shafts 65 are sprockets or pulleys 77a while a pulley 78 is mounted on each of the shafts of the knocker rolls 41 and 41'. Idler sprockets or pulleys 79 are adjustably arranged to assume the slack in the belt or chain 80, which is driven by the driving sprocket or pulley 27, mounted on the drive shaft 26, and extends over the sprocket or pulleys 77a, 78, idler pulley 79 and under a sprocket or pulley 81 which drives the conveyor 44, thence under a pulley or sprocket 82 which drives the boll breaker 49, thence over the second idler sprocket 79, thence under the companion knocker roll shaft 41a and 41b, thence over the companion sprocket wheel or pulley 77a of the stripper assembly. In this manner, all of the elements of the assembly are operated in the proper direction by means of the motor 25 located at the front of machine.

The blower 55 which elevates the cotton into the receptacle 52 from box 54 is operated in the manner shown in Figure 2 by means of a chain or belt 83 from the shaft of the boll breaker 49.

In order to constrain the stalks of cotton to move into the operative radius of the stripping assemblies, parallel, vertically disposed drums 84 (Figures 1 and 7), are provided, having shafts 85. These drums are required to be rotated in opposite directions to properly guide the stalks into position and in order to operate the drums in this manner, there is provided a beveled gear 86 on each of the vertical shafts thereof, which gears enmesh similar gears 87 on a transverse shaft 88. A chain or belt 89 engages a pulley or sprocket 90 on the shaft 88 and is driven by means of a pulley or sprocket 91 on a jack shaft 92, the latter carrying on its outer end a pulley or sprocket 93 over which operates a belt or chain 94, the latter extending to the rear of the machine and is driven by means of a pulley or sprocket 95 on the axle 34 of one of the rear wheels 11.

The drums 84 are raised and lowered along with the mechanism previously described and guides 96 are mounted in parallel relationship to the vertically slidable plate 70 at the front of the machine to maintain perpendicularity of the drums 84 with respect to the ground.

The receptacle 52, previously mentioned, is mounted in a frame 96a at the extreme rear of the machine in such manner that its left end, viewing the machine from the rear in Figure 2, may be raised by means of a lever 97. One end of the lever has a rope 98 attached thereto by which the lever is actuated on its pivot shaft 98a mounted in the upper ends of a pair of uprights 98b which are supported on the machine frame. The free end of the lever has a protuberance 98c which engages the end of the receptacle 52 when the lever is pulled downwardly by the rope 98, causing the left or closed end of the receptacle to be elevated so that its contents will slide out of the opposite end into a waiting conveyance when the door 99 of the receptacle is opened. The closure 99 is hinged at 99a at the top edge of the open end of the receptacle and swings outwardly as shown in dotted lines in Figure 2. On each side of the receptacle is an arcuated arm 100 whose outer end is pivoted at 100a to the side of the door 99. The arm is movable between opposed guide rollers 101 pivoted to the side of the receptacle as the door 99 is raised and lowered and these arms, one on each side of the receptacle guide the door in its movement.

Mounted for inward and outward sliding displacement in the open end of the receptacle is a chute 101a which directs the contents of the receptacle such as over the side boards of a wagon or truck which is drawn alongside the machine to receive the cotton harvested thereby and discharged from the receptacle 52.

While not a part of the invention, the drawing shows a pair of uprights 102 spaced apart longitudinally of the machine frame. Extending between these uprights is a shaft 103 and from the midsection of this shaft is suspended a scale beam 104. This scale beam is of a design and construction conventionally employed for weighing harvested cotton in the field but is not used herein except when cotton is harvested on a share basis, that is to say, on a basis where the owner of the harvesting machine harvests cotton for a farmer for a share of the crop. In such cases, the cotton is dumped from receptacle 52 into bags which are weighed on the scale beam 104.

In the course of the foregoing description, each part and its relationship to other parts in the machine were described with great particularity and it is therefore considered that the operation of the machine as a whole will become at once apparent to those skilled in the art and a description of operation therefore becomes unnecessary.

Manifestly, the construction as shown and described is capable of some modification and such modification as may be construed to fall within the scope and meaning of the appended claims is also considered to be within the spirit and intent of the invention.

What is claimed is:

1. In a cotton harvesting machine, a self propelled frame, a stalk stripping assembly including two parallel groups of vertically spaced rollers disposed longitudinally in said frame and adapted to rotate in opposite directions, the upper roller of one of said groups of rollers being disposed above the upper roller of the companion group, an endless belt surrounding and operated by each group of rollers, the belts of said groups of rollers being disposed with their upgoing leads in juxtaposition, spaced fingers affixed to each of said belts, sprocket wheels on the upper and lower rollers of said groups, chains affixed to said belts and cooperating with said sprockets for maintaining timed relationship in the travel of said belts, a knocker roller for discharging from said fingers material elevated thereby from stalks of field cotton, a perforated tube adjacent to and coextensive with the top of said stripping assembly, means for introducing air under pressure into said tube for discharge through its perforations to supplement the effects of said knocker roller, means for receiving material discharged by said knocker roller and said air discharge and pneumatic means for elevating material from said receiving means to a storage receptacle.

2. In a cotton harvesting machine, a wheeled frame, a stalk stripping assembly comprising two parallel groups of vertically spaced rollers disposed longitudinally in said frame, an endless belt operating on each group of rollers, the upgoing leads of said belts being in juxtaposition, relatively spaced fingers mounted on each of said belts, the latter moving in counter directions to cause said fingers to be brought into confronting relationship in their upward travel to elevate material stripped from the stalks, knocker rolls parallel with and adjacent the top of said stripping assembly, a chute into which material is discharged from said fingers by said knocker rolls, a perforated tube parallel with the top of said stripping assembly for discharging streams of air across the tops of said groups of rollers in the direction of said chute to supplement the action of said knocker rolls, a conveyor at the lower end of said chute for receiving material discharged by said knocker rolls and air streams and for moving said material rearwardly of said machine frame, a receptacle for said material, means for driving said stripping assembly and said knocker rolls and means for elevating material from the delivery end of said conveyor into said receptacle for disposition.

3. In a cotton harvesting machine, a wheeled frame, a stalk stripping unit comprising two parallel groups of vertically spaced rollers mounted on shafts, a vertically adjustable plate at each end of said frame in which the ends of said roller shafts are journaled, an endless belt operating over the rollers of each of said group, said belts having their upgoing ends in juxtaposition, relatively spaced stripping fingers carried by each of said belts adapted to jointly engage and strip from cotton stalks the fruit thereof and for elevating the same between the inner leads of said belts, a bladed roller adjacent the top of each group of rollers for discharging from said fingers the material elevated thereby, an elongated and perforated conduit parallel with the top of said groups of rollers whose perforations are directed towards the upper portion of said stripping unit for directing a stream of air thereacross and adapted to supplement the discharging action of said bladed rollers, means for introducing air under pressure into said conduit, a chute for receiving the material discharged by said bladed rollers and said stream of air, means for conveying material from said chute towards the rear of said frame, a receptacle into which said material is delivered by said conveyor, and a common means for driving said rollers, material discharging means, and said conveying means.

GEORGE W. LEWIS.

REFERENCES CITED

The following references are of record in the file of this patent:

UNITED STATES PATENTS

| Number | Name | Date |
|---|---|---|
| 794,265 | Watson | July 11, 1905 |
| 1,122,172 | Thomas | Dec. 22, 1914 |
| 1,132,102 | Lee | Mar. 16, 1915 |
| 1,195,030 | Keeling | Aug. 15, 1916 |
| 1,400,522 | Cannon | Dec. 20, 1921 |
| 1,700,926 | Dykes | Feb. 5, 1929 |
| 1,722,747 | Hentz | July 30, 1929 |
| 1,740,274 | Speck | Dec. 17, 1929 |
| 1,778,587 | Crumley | Oct. 14, 1930 |
| 2,136,126 | Dove | Nov. 8, 1938 |
| 2,399,718 | Baker et al. | May 7, 1946 |